P. MILES.
Sausage Machine.

No. 62,052.

Patented Feb. 12, 1867.

Witnesses:
Geo. D. Walker.
Chas. H. Smith

Inventor:
Purches Miles

United States Patent Office.

PURCHES MILES, OF NEW YORK, N. Y., ASSIGNOR TO THEODORE MACE, OF SAME PLACE.

*Letters Patent No. 62,052, dated February 12, 1867.*

SAUSAGE STUFFER.

*The Schedule referred to in these Letters Patent and making part of the same.*

TO ALL WHOM IT MAY CONCERN:

Be it known that I, PURCHES MILES, of the city and State of New York, have invented, made, and applied to use a certain new and useful Improvement in Sausage Stuffers; and I do hereby declare the following to be a full, clear, and exact description of the said invention, reference being had to the annexed drawing making part of this specification, wherein—

Similar marks of reference denote the same parts.

Figure 1:
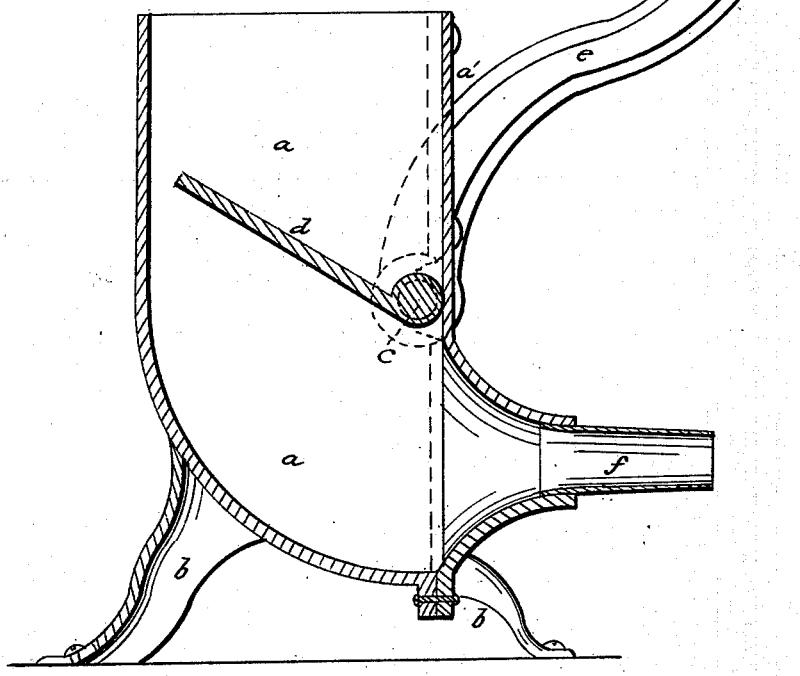
Figure 1 is a vertical section of the said sausage stuffer.
Figure 2:
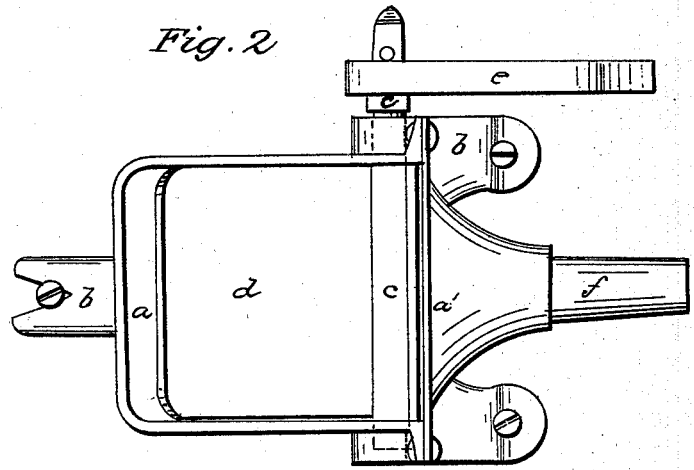
Figure 2 is a plan of the same.

The object of my invention is to obtain a compact, strong, and durable sausage stuffer, that can be cleaned out with great facility, and has no parts that are liable to become broken or displaced in use.

My invention consists in a swinging follower, actuated by a lever, and placed within a hopper that has a bottom curved from the centre, on which the follower swings, so that sausage meat entered within the hopper is, by said follower, pressed out from the side of said hopper through a nozzle provided for the intestine.

In the drawing, $a$ is a hopper, secured and sustained by legs $b$ $b$, or other supports, that may be screwed to a table. The lower part of the hopper is curved from the axis $c$ of the follower $d$, that is, of a size to correspond with the space or opening of the hopper in which it is swung, by the action of a lever, $e$, that is on the outer end of the axis $c$. I prefer that the hopper $a$ be made of cast iron, the sides and curved bottom being in one piece, and the front $a'$ being made as a plate, so as to allow of the introduction of the follower $d$ and its axis $c$ (also of cast metal) being introduced, after which the parts $a$ $a'$ of the hopper are secured together by rivets or screws. My sausage stuffer is thus constructed very easily and cheaply, there being but four principal parts, the two pieces of the hopper, the follower and its axis, and the handle. The tube for the delivery of the sausage meat into the intestine I prefer to have made of sheet metal, as at $f$. This may be movable, and introduced from the inside, so as to facilitate cleaning. The follower $d$ should be turned up against the front plate $a'$ when the minced meat is introduced, and upon being brought down it presses the meat out through the nozzle. If meat should be supplied into the hopper so as to fall on the back of the follower, the reverse movement of the handle brings the follower up against the front plate $a'$, and squeezes out the meat from between $d$ and $a'$, and it falls over the end of $d$ into its place for being forced through the nozzle $f$.

I do not claim a swinging valve, as that has been used without a hopper, to force the sausage meat out of a curved case; in that instance, the meat could only be supplied when the valve is turned back. In my improvement the meat can be continually supplied into the hopper, and will fall over from the back of the follower when said follower is being moved back to take a fresh charge. What I claim, and desire to secure by Letters Patent, is—

The follower $d$ and axle $c$, in combination with the vertical hopper $a$, having a curved bottom, and the nozzle $f$ introduced through the vertical side $a'$, as specified.

I also claim forming the hopper $a$, with the curved bottom and sides cast in one piece, to receive the follower $d$, axle $c$, and front $a'$, as and for the purposes specified. Dated December 5, 1866.

PURCHES MILES.

Witnesses:
CHAS. H. SMITH,
GEO. D. WALKER.